United States Patent Office 3,166,703
Patented Jan. 19, 1965

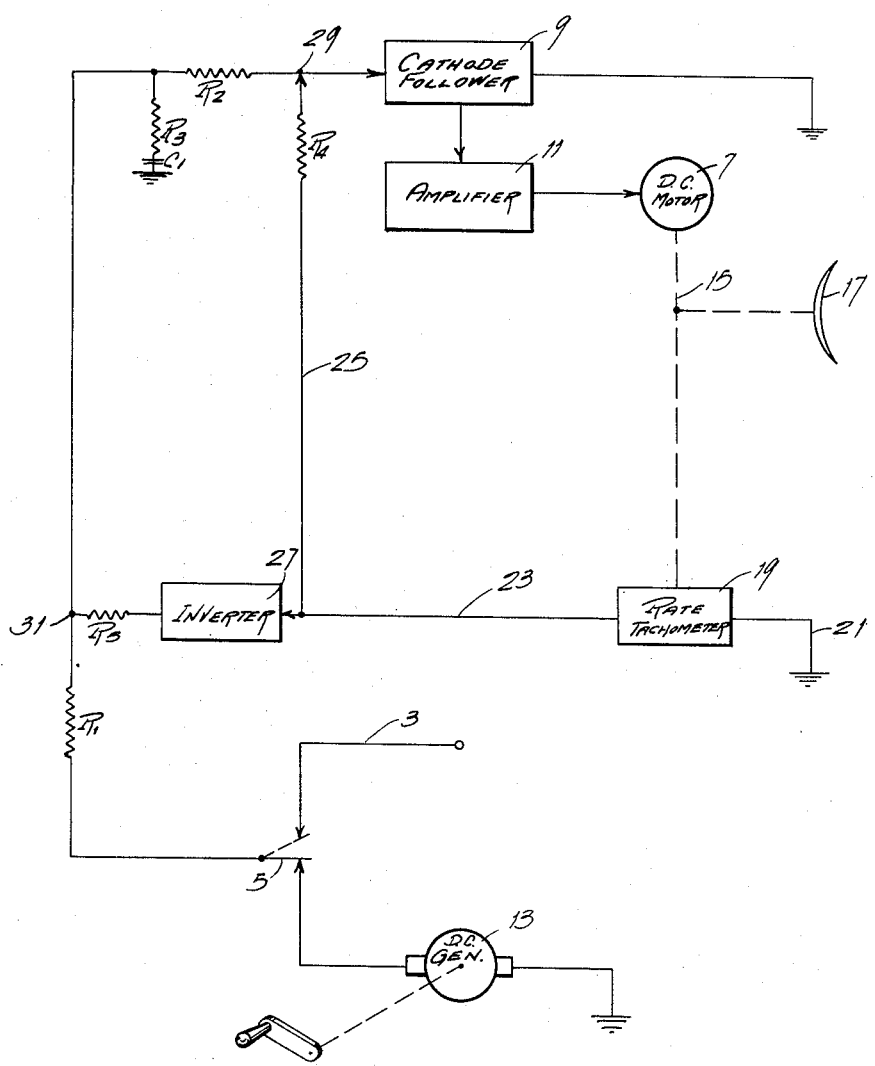
INVENTOR.
ALFRED I. MINTZER
BY
ATTORNEY

3,166,703
SIMPLIFIED AIDED TRACKING AND
COASTING SYSTEM
Alfred I. Mintzer, Riverton, N.J., assignor, by mesne assignments, to the United States of America as represented by the Secretary of the Navy
Filed Apr. 9, 1963, Ser. No. 271,825
2 Claims. (Cl. 318—327)

This is a continuation-in-part of patent application, Serial No. 105,828, filed April 26, 1961; now Patent No. 3,093,784, dated June 11, 1963.

The present invention relates to a novel and improved aided tracking and coasting system and more particularly to a novel and improved aided tracking and coasting system wherein displacement and rate tracking are accomplished with unified control and yet without the use of costly integrators or additional rate servos.

Aided tracking is a combination of displacement and rate tracking. In pure displacement tracking the operator has a direct connection either mechanically or electrically with the controlled member. In tracking a target moving at constant rate, the operator must turn his handwheel at a constant rate. If he is lagging the target, he will turn faster until the error is corrected; if he is leading the target, he will turn more slowly. In pure rate tracking it is the speed of the output that is determined by the position of the operator's handwheel. In tracking a target moving at a constant rate the handwheel need not be turned after the proper adjustment has been made. When these two types of tracking are combined, aided tracking results. An error in rate and the resulting displacement error are corrected simultaneously. A change in the handwheel position changes the rate of motion of the output at the same time that the displacement error is corrected. Although various types of aided tracking systems have been suggested and used in the past, considerable difficulty has been experienced heretofore in providing such a system having unified control with capability of sustained accurate coast without the use of expensive and bulky integrators and/or additional rate servos.

It is therefore a principal object of the present invention to provide a novel and improved aided tracking system which provides unified control without the use of costly integrators and/or additional rate servos.

It is a further object of the present invention to provide a novel and improved aided tracking system which provides sustained coast capability without exponential or other substantial decay with time.

Other objects and many of the attendant advantages of this invention will be readily appreciated as the same becomes better understood by reference to the following detailed description when considered in connection with the accompanying drawing(s) wherein:

The single figure of the drawing is a diagrammatic view of a preferred embodiment of the present invention.

Referring to the drawing, the azimuth or elevation error signal from conventional radar equipment not shown in the drawing is coupled to the improved aided track and coasting circuitry of the present invention through conductor 3. When switch 5 engages its upper contact, the direct current motor or the like 7 is energized by a circuit that extends from conductor 3 successively through switch 5, resistors R–1 and R–2, cathode follower 9, amplifier 11 and the motor to ground. When switch 5 engages its lower contact, motor 7 is energized by a circuit that extends from the direct current generator 13 through switch 5, resistors A–1 and R–2, cathode follower 9, amplifier 11 and the motor to ground. Operation of switch 5 may be controlled either manually as shown or in any other suitable manner such as from a remote point through a conventional relay control circuit. The junction of resistor R–1 with resistor R–2 is connected to ground through resistor R–3 and coasting condenser C–1. Resistor R–1 is chosen such that its resistance is many times greater than the resistance of resistor R–3. The output shaft 15 of motor 7 is mechanically coupled to the radar antenna or other load 17 and also to the input shaft of the rate tachometer 19. One side of the electrical output circuit of tachometer 19 is grounded through conductor 21. The other side of the tachometer output circuit is connected to the cathode follower 9 through conductors 23 and 25 and resistor R–4. Resistor R–4 is chosen such that its resistance is equal to that of resistor R–2. The output circuit of tachometer 19 is also connected to cathode follower 9 through a circuit that extends from the tachometer through conductor 23, inverter 27, and resistors R–5 and R–2. Resistor R–5 is chosen such that its resistance is equal to that of resistor R–1. Tachometer 19 is designed and constructed so as to develop an output potential which is opposite in polarity to the net signals applied to cathode follower 9 from conductor 3 and generator 13.

In operation when the radar system functions in its so-called acquisition mode prior to its locking on any target, switch 5 is operated so as to engage its lower contact. The operator then rotates the handwheel of generator 13 at an appropriate angular rate. The potential developed by the generator is applied through resistors R–1 and R–2, cathode follower 9 and amplifier 11 and energizes motor 7. Rotation of shaft 15 of motor 7 drives the antenna 17 and also rotates the armature of rate tachometer 19. Tachometer 19 develops a direct current voltage which is applied to the input circuit of cathode follower 9 through resistor R–4. Thus, as the antenna 17 rotates and follows a moving target at a rate that corresponds to the rate prescribed by rotation of the generator handwheel, the error potential at 29 that is produced as a result of the flow of current from generator 13 through resistor R–2 and the flow of current from tachometer 19 through resistor R–4 tends to null.

The potential developed by rate tachometer 19 is also coupled to the input circuit of inverter 27 through conductor 23. Inverter 27 reverses the polarity of the tachometer signal such that the polarity of its output signal is the same as that of the signal from conductor 3 or generator 13. The signal from inverter 27 and the signal from generator 13 are then combined in the resistor mixing network of resistors R–1 and R–5 and the resultant potential is applied in the manner described hereinabove to the input circuit of cathode follower 9 and motor 7.

When the radar gear locks on a desired target and functions in its so-called automatic mode, switch 5 is operated so as to engage its upper contact. When this occurs, the error signal on conductor 3 from the radar tracking circuitry not shown in the drawing together with the output signal of inverter 27 is now applied to the input circuit of cathode follower 9 and motor 7 through resistors R–1, R–5 and R–2. Otherwise, operation of the circuit is similar to that described hereinabove when generator 13 generizes the circuit.

Condenser C–1 is charged through resistor R–3 by the net potential at 31 of the inverter signal and the signal from conductor 3 or generator 13. Thus, when the signal from conductor 3 is interrupted by jamming or for any other reason, condenser C–1 continues to provide the driving energy for motor 7. Moreover, the feedback energy from tachometer 19 through inverter 27 substantially maintains the charge across condenser C–1. In this way the mechanism will continue coast at the rate last developed on conductor 3. If the rate voltage is somewhat less than the voltage stored across condenser C-1 the speed of motor 7 will gradually decay. If the rate voltage is somewhat greater than the voltage stored across condenser C-1, the speed of motor 7 will gradually increase. The effective coast, however, can be maintained with reasonable accuracy over wide tolerance limits.

Although the above described system finds particular use in any type of radar tracking device it could also be used in other suitable automated operation or the like without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. An aided tracking system comprising:
    (a) a variable source of potential;
    (b) an electric motor;
    (c) a rate tachometer which is mechanically coupled to the output shaft of the motor and which provides an electrical potential opposite in polarity to the potential of the variable source;
    (d) means for inverting the polarity of the output potential of the tachometer;
    (e) means for combining the inverted potential of the tachometer with the potential of the variable source;
    (f) and means responsive to the difference between the said combined potential and the output potential of the tachometer for energizing the motor.

2. An aided tracking system comprising:
    (a) a variable source of potential;
    (b) an electric motor;
    (c) a rate tachometer which is mechanically coupled to the output shaft of the motor and which provides an electrical potential opposite in polarity to the potential of the variable source;
    (d) means for inverting the polarity of the output potential of the tachometer;
    (e) means for combining the inverted potential of the tachometer with the potential of the variable source;
    (f) means for integrating the combined potential of the variable source and the inverted output potential of the tachometer;
    (g) and means responsive to the difference between the integrated potential and the output potential of the tachometer for energizing the motor.

References Cited by the Examiner
UNITED STATES PATENTS

| | | | |
|---|---|---|---|
| 2,471,422 | 5/50 | Frost | 318—207 |
| 2,513,537 | 7/50 | Williams | 318—327 |
| 3,093,784 | 6/63 | Minter | 318—327 |

JOHN F. COUCH, *Primary Examiner.*